United States Patent
Gesell

(10) Patent No.: US 10,059,171 B2
(45) Date of Patent: Aug. 28, 2018

(54) BLOWER ASSEMBLY FOR A VEHICLE AIR CONDITIONING UNIT AND METHOD FOR OPERATING A VEHICLE AIR CONDITIONING UNIT

(71) Applicant: Valeo Klimasysteme GmbH, Bad Rodach (DE)

(72) Inventor: Bodo Gesell, Schaafheim (DE)

(73) Assignee: Valeo Klimasysteme GmbH, Bad Rodach (DE)

( * ) Notice: Subject to any disclaimer, the term of this patent is extended or adjusted under 35 U.S.C. 154(b) by 810 days.

(21) Appl. No.: 14/381,104

(22) PCT Filed: Feb. 28, 2013

(86) PCT No.: PCT/EP2013/054001
§ 371 (c)(1),
(2) Date: Aug. 26, 2014

(87) PCT Pub. No.: WO2013/127903
PCT Pub. Date: Sep. 6, 2013

(65) Prior Publication Data
US 2015/0024669 A1    Jan. 22, 2015

(30) Foreign Application Priority Data

Mar. 2, 2012   (DE) ......................... 10 2012 004 655

(51) Int. Cl.
*B60H 1/00*    (2006.01)
*B60H 1/24*    (2006.01)

(52) U.S. Cl.
CPC ........... *B60H 1/24* (2013.01); *B60H 1/00735* (2013.01); *B60H 1/00849* (2013.01);
(Continued)

(58) Field of Classification Search
CPC .. B60H 1/24; B60H 1/00735; B60H 1/00849; B60H 2001/00135
See application file for complete search history.

(56) References Cited

U.S. PATENT DOCUMENTS 5,699,960 A * 12/1997 Kato .................... B60H 1/0065
   237/12.3 A
6,166,351 A * 12/2000 Yamamoto ......... B60H 1/00064
   219/202

(Continued)

FOREIGN PATENT DOCUMENTS

DE   102010035740 A1 *  3/2012 ........... B60H 1/0005
JP      2003291625 A    10/2003

OTHER PUBLICATIONS

English language abstract and machine-assisted English translation for DE102010035740 extracted from espacenet.com database on Nov. 4, 2014, 10 pages.

(Continued)

*Primary Examiner* — Steven B McAllister
*Assistant Examiner* — Jonathan Cotov
(74) *Attorney, Agent, or Firm* — Howard & Howard Attorneys PLLC

(57) ABSTRACT

A blower assembly for a vehicle air conditioning unit includes a first air flow duct having a first blower and a second air flow duct having a second blower. A fresh-air inlet opening is arranged in the first air flow duct and a recirculated-air inlet opening is arranged in the second air flow duct. A distribution chamber is downstream of the first and second air flow ducts and an air cooling unit and a bypass duct bypassing the air cooling unit are downstream of the distribution chamber. A bypass flap is in the distribution chamber for directing at least a part of the air flow in the first air flow duct to the air cooling unit and/or to the (Continued)

bypass duct with substantially all of the air flow in the first air flow duct directed into the bypass duct in one position of the bypass flap.

13 Claims, 3 Drawing Sheets

(52) U.S. Cl.
CPC .............. *B60H 2001/00085* (2013.01); *B60H 2001/00135* (2013.01); *Y02T 10/88* (2013.01)

(56) References Cited

U.S. PATENT DOCUMENTS

| | | | | |
|---|---|---|---|---|
| 6,192,698 B1 * | 2/2001 | Kakehashi | ......... | B60H 1/00064 165/203 |
| 6,253,841 B1 * | 7/2001 | Obara | ............... | B60H 1/00849 165/204 |
| 6,311,763 B1 * | 11/2001 | Uemura | ............. | B60H 1/00664 165/43 |
| 6,352,102 B1 * | 3/2002 | Takechi | ............. | B60H 1/00064 165/203 |
| 6,959,754 B2 * | 11/2005 | Lee | .................... | B60H 1/00064 165/202 |
| 7,082,990 B1 * | 8/2006 | Uemura | ............. | B60H 1/00849 165/203 |
| 7,413,007 B2 * | 8/2008 | Yamaoka | ................. | B60H 1/03 137/512.15 |
| 7,931,075 B2 * | 4/2011 | Ito | ..................... | B60H 1/00028 165/122 |
| 9,802,463 B2 * | 10/2017 | Maeda | ................. | B60H 1/3227 |
| 2007/0243808 A1 * | 10/2007 | Mathur | ............. | B60H 1/00764 454/75 |
| 2010/0144261 A1 * | 6/2010 | Barkic | ............... | B60H 1/00457 454/75 |
| 2012/0241126 A1 * | 9/2012 | Kishi | ................. | B60H 1/00849 165/42 |

OTHER PUBLICATIONS

English language abstract and machine-assisted English translation for JP2003291625 extracted from espacenet.com database on Nov. 4, 2014, 16 pages.

International Search Report for PCT/EP2013/054001 dated May 28, 2013, 3 pages.

* cited by examiner

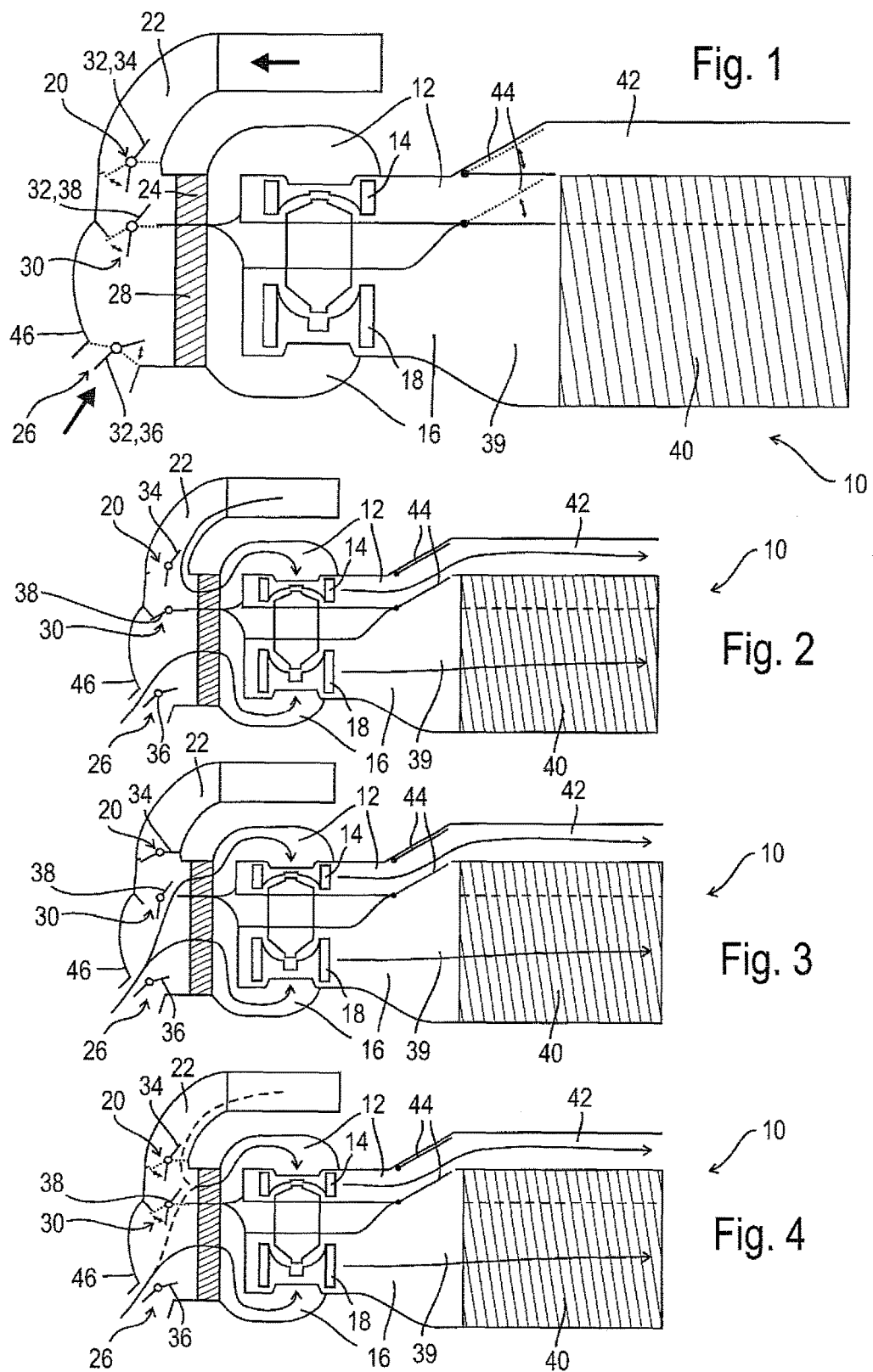

BLOWER ASSEMBLY FOR A VEHICLE AIR CONDITIONING UNIT AND METHOD FOR OPERATING A VEHICLE AIR CONDITIONING UNIT

RELATED APPLICATIONS

This application is the National Stage of International Patent Application No. PCT/EP2013/054001, filed on Feb. 28, 2013, which claims priority to and all the advantages of German Patent Application No. 10 2012 004 655.3, filed on Mar. 2, 2012, the content of which is incorporated herein by reference.

The invention relates to a blower assembly for a vehicle air conditioning unit, having a first air flow duct, in which a first blower is arranged, and a second air flow duct, in which a second blower is arranged. The invention also relates to a vehicle air conditioning unit having such a blower assembly and also to a method for operating a vehicle air conditioning unit.

Known from the prior art are blower assemblies for vehicle air conditioning units, having two air flow ducts in each of which a blower is arranged. The different air flow ducts are in this case assigned to different ventilation openings of the vehicle air conditioning unit in the vehicle interior, for example to ventilation openings for the windshield, for the dashboard or for the footwell.

In conventional vehicle air conditioning units, cold fresh air can be heated up by engine waste heat. However, in modern electric or hybrid vehicles, the flow of waste heat from the drive engine is not sufficient to heat up the cold fresh air sufficiently. Therefore, additional energy is required in order to heat up the cold fresh air. When the vehicle air conditioning unit is operated with recirculated air, the recirculated air, which contains a relatively high level of humidity, has to be dried by being cooled and reheated, this in turn requiring energy.

It is the object of the invention to create a blower assembly for a vehicle air conditioning unit and also an air conditioning unit and a method for operating an air conditioning unit, which make it possible to operate a vehicle air conditioning unit with low energy expenditure.

This object is achieved according to the invention by a blower assembly for a vehicle air conditioning unit, having a first air flow duct, in which a first blower is arranged, and a second air flow duct, in which a second blower is arranged, wherein the first air flow duct comprises a fresh-air inlet opening upstream of the first blower and the second air flow duct comprises a recirculated-air inlet opening upstream of the second blower. A distribution chamber is provided downstream of the first and second air flow ducts and an air cooling unit and a bypass duct bypassing the air cooling unit are provided downstream of the distribution chamber. In the distribution chamber there is a bypass flap, which directs at least a part of the air flow in the first air flow duct to the air cooling unit and/or to the bypass duct. Substantially all of the air flow in the first air flow duct is directed into the bypass duct in one position of the bypass flap.

Preferably, substantially all of the air flow in the second air flow duct is directed in the distribution chamber to the air cooling unit.

"Substantially all of the air flow" in an air flow duct is considered to be all of the air flow through the particular air flow duct with the exception of minor leakages which can occur for example in the region of the distribution chamber and at the bypass flap. Preferably, there are provided seals, which keep the leakage as small as possible.

The expression "downstream" relates in each case to the direction of the air flow through the blower assembly or the vehicle air conditioning unit.

By way of the invention, it is possible to direct fresh air or recirculated air, which is drawn in in the first air flow duct, past the air cooling unit, optionally via the bypass duct, and to mix the air flows through the two air flow ducts only after the air cooling unit. In this way, the two air flows can be conditioned differently, thereby making it possible to save energy.

Furthermore, the object is achieved by a blower assembly according to the invention having the additional or alternative feature that there is provided an optionally closable transfer opening which optionally forms a connection between the first and second air flow ducts, and a flap system which controls a flow of fresh air through the fresh-air inlet opening into the first air flow duct, a flow of recirculated air through the recirculated-air inlet opening into the second air flow duct and a flow of transfer air between the two air flow ducts through the transfer opening.

This makes it possible for fresh air to be drawn in in the first air flow duct and for recirculated air to be drawn in in the second air flow duct, for fresh air to be drawn in in both air flow ducts, for recirculated air to be drawn in in both air flow ducts or for corresponding mixing ratios of recirculated air and fresh air to be drawn in. In this way, flexible drawing-in of fresh air and/or recirculated air is made possible, this in turn ensuring low-energy operation of the vehicle air conditioning unit.

The flap system can have a fresh-air flap at the fresh-air inlet opening, a recirculated-air flap at the recirculated-air inlet opening and/or a transfer flap at the transfer opening. For example, the fresh-air flap, the recirculated-air flap and/or the transfer flap can be in the form of butterfly valves.

In order to reduce the number of moving parts, the flap system can have a common flap at at least two openings. For example, the openings can be the recirculated-air inlet opening, the fresh-air inlet opening and/or the transfer opening. The common flap is in the form for example of a cylinder valve.

Optimum filtering of the drawn-in air is made possible in that a filter is provided between the fresh-air inlet opening and the blower of the first air flow duct and/or a filter is provided between the recirculated-air inlet opening and the blower of the second air flow duct, wherein the transfer opening is arranged preferably upstream of the filters.

It is possible for the two filters to be formed by a common filter element or by in each case individual filter elements.

The air cooling unit is for example an evaporator.

A compact construction of the blower assembly is made possible in that the first and second blowers are in the form of a twin blower.

Preferably, the first and second air flow ducts are formed in an air-inlet housing.

A vehicle air conditioning unit according to the invention comprises an above-described blower assembly.

The object of the invention is also achieved by a method according to the invention for operating a vehicle air conditioning unit, in particular a vehicle air conditioning unit according to the invention, having a first air flow duct, in which a first blower is arranged, and a second air flow duct, in which a second blower is arranged, and also an air cooling unit. The following method steps are provided: at least one air quality parameter of supplied fresh air and/or recirculated air is determined. An operating mode of the vehicle air conditioning unit is selected depending on the at least one air quality parameter. Depending on the selected operating mode, optionally fresh air or recirculated air is drawn in in the first and/or second air flow duct. The air flowing through the second air flow duct is cooled and dried in the air cooling unit with the second air flow duct open. Depending on the selected operating mode, with the first air flow duct open, the air flowing through the first air flow duct is optionally cooled and dried in the air cooling unit or directed past the air cooling unit. The air flowing through the first and second air flow ducts is mixed to form a common air flow. In this way, the vehicle air conditioning unit can be operated in an energy-saving manner, since the air can be conditioned separately in the two air flow ducts.

Preferably, at cold outside temperatures, the following steps are carried out: drawing in exclusively fresh air via the first air flow duct and recirculated air via the second air flow duct, and directing the air flowing through the first air flow duct past the air cooling unit. At cold outside temperatures, in particular less than/equal to 5° C., the fresh air is cold and dry and therefore does not need to be dried. The recirculated air, which flows in the other air flow duct, is, by contrast, warm and moist and should therefore be dried. To this end, it flows through the air cooling unit, wherein humidity is removed from the recirculated air by condensation. After the air cooling unit, the dried recirculated air is mixed with the fresh air and the common air flow can be reheated to the desired air temperature. This is particularly advantageous when the air cooling unit is part of a heat pump circuit, since in this way a maximum of energy can be withdrawn from the recirculated air, it being possible for said energy to subsequently be used for reheating the common air flow.

Furthermore, in one operating mode, the following steps can be carried out: drawing in fresh air and/or recirculated air via the first air flow duct and recirculated air via the second air flow duct and directing the air flowing through the first air flow duct past the air cooling unit, wherein the mixing ratios of fresh air and recirculated air are selected such that the required energy for reheating the common air flow is minimized.

It is possible that in one operating mode, the following steps are carried out: drawing in fresh air and/or recirculated air via the first air flow duct and recirculated air via the second air flow duct and directing at least a part of the air flowing through the first air flow duct past the air cooling unit, wherein the mixing ratios of fresh air and recirculated air and/or of that portion of the air flowing through the first air flow duct that is directed past the air cooling unit are selected such that the required energy for reheating the common air flow is minimized.

An air cooling unit can be operated only at temperatures below a particular maximum temperature, since, above this maximum temperature, unpleasant smells and microbial growth can occur on account of the condensed liquid in the air cooling unit. At average outside temperatures, in particular between 5° C. and 20° C., it is possible that, on account of the maximum temperature of the air cooling unit, the recirculated air will have to be cooled to a lower temperature than is required. In conventional systems, the cooled and dried air subsequently has to be heated again. On account of the drawing in of fresh air and/or recirculated air in the first air flow duct and the directing thereof, via the bypass duct, past the air cooling unit in a system according to the invention, this air can be mixed with the recirculated air cooled by the air cooling unit, an average temperature and average humidity being set in the optimum case, with reheating not being required. In this way, the required energy for reheating the common air flow is at least partially reduced.

The air cooling unit can be operated as part of a heat pump, wherein the heat obtained in the air cooling unit is used to reheat the common air flow.

In one operating mode, the following steps can be carried out: drawing in fresh air via both air flow ducts and cooling and drying the fresh air by way of the air cooling unit. Since the fresh air is drawn in via both air flow ducts, the blowers can be utilized optimally. This is particularly advantageous at warm outside temperatures, in particular in a temperature range between 15° C. and 25° C.

In a further operating mode, the following steps can be carried out: drawing in fresh air and/or recirculated air via the first air flow duct and recirculated air via the second air flow duct and cooling and drying the air flows in both air flow ducts by means of the air cooling unit. Since, at hot outside temperatures, in particular above 25° C., the cooling of the fresh air would require an excessive energy demand, energy can be saved in that recirculated air is drawn in in both air flow ducts. For an optimum air quality, in particular oxygen content, in the vehicle interior, fresh air can be added to the recirculated air in the first air flow duct.

Further features and advantages of the invention will become apparent from the following description and from the drawings, to which reference is made and in which:

FIG. 1 shows a schematic view of a blower assembly according to the invention according to a first embodiment of the invention;

FIG. 2 shows the blower assembly according to FIG. 1 in a first operating mode;

FIG. 3 shows the blower assembly according to FIG. 1 in a second operating mode;

FIG. 4 shows the blower assembly according to FIG. 1 in a third operating mode;

Figure 5:
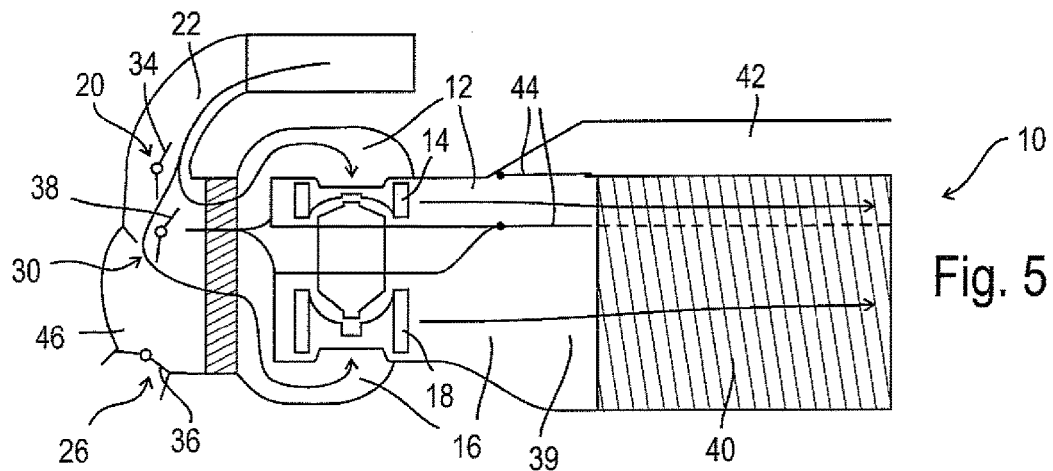
FIG. 5 shows the blower assembly according to FIG. 1 in a fourth operating mode.

A first embodiment of a blower assembly 10 for a vehicle air conditioning unit in FIG. 1 comprises a first air flow duct 12, in which a first blower 14 is arranged, and a second air flow duct 16, in which a second blower 18 is arranged. In the embodiment shown, the first blower 14 and the second blower 18 are in the form of a twin blower, which has a common drive motor. However, it is also possible for the two blowers 14, 18 to be in the form of separate blowers.

The first air flow duct 12 is connected via a fresh-air inlet opening 20 to a fresh air duct 22, which forms a connection to the exterior of the vehicle for the supply of fresh air.

Arranged between the fresh-air inlet opening 20 and the first blower 14 is a first filter 24.

The second air flow duct 16 is connected via a recirculated-air inlet opening 26 to a recirculated air duct, which leads into the interior of the vehicle and thus allows air to be drawn in from the vehicle interior.

A second filter 28 is provided between the recirculated-air inlet opening 26 and the second blower 18 in the second air flow duct 16.

In the embodiment shown, the filters 24, 28 in the first and second air flow ducts 12, 16 are in the form of individual filter elements which are integrated into a common assembly. In this way, optimum separation between the first and second air flow ducts 12, 16 is made possible even in the region of the filters 24, 28, while easy replacement of the filters 24, 28 is made possible by the common assembly. However, it is also possible for the filters 24, 28 to be formed by individual separate filter elements or by a common filter element.

An optionally closable transfer opening 30 optionally forms a connection between the first and second air flow ducts 12, 16. In the embodiment shown, the transfer opening 30 is arranged upstream of the two blowers 14, 18 of the two air flow ducts 12, 16 and also preferably upstream of the filters 24, 28.

There is provided a flap system 32, which controls a flow of fresh air through the fresh-air inlet opening into the first air flow duct 12, a flow of recirculated air through the recirculated-air inlet opening 26 into the second air flow duct 16, and a flow of transfer air between the two air flow ducts 12, 16 through the transfer opening 30. In the embodiment shown in FIG. 1, the flap system 32 has a fresh-air flap 34 at the fresh-air inlet opening 20, a recirculated-air flap 36 at the recirculated-air inlet opening 26 and a transfer flap 38 at the transfer opening 30. The fresh-air flap 34, recirculated-air flap 36 and transfer flap 38 are each in the form of butterfly valves. However, is also possible for other types of flaps to be provided.

Provided downstream of the first and second air flow ducts 12, 16 is a distribution chamber 39.

Provided downstream of the distribution chamber 39 is an air cooling unit 40 and a bypass duct 42 bypassing the air cooling unit 40.

The air cooling unit 40 makes it possible to cool the air flowing through it, wherein humidity contained in the air can condense at the air cooling unit 40 and flow away, with in particular drying of the air being made possible as a result.

In the embodiment shown, the air cooling unit 40 is an evaporator which is part of a coolant circuit which can be operated as a heat pump. However, another type of air cooling unit 40 can also be provided, for example a heat exchanger which is operated with a liquid coolant.

In the distribution chamber 39 there is a bypass valve 44, which directs at least a part of the air flow in the first air flow duct 12 optionally to the air cooling unit 40 or to the bypass duct 42. There is provided a position of the bypass flap 44 in which substantially all of the air flow in the first air flow duct 12 is directed into the bypass duct 42.

The distribution chamber 39 is formed such that substantially all of the air flow in the second air flow duct 16 is directed to the air cooling unit 40.

The first and second air flow ducts 12, 16 are formed in an air-inlet housing 46. The air-inlet housing 46 forms two intake chambers which are assigned to the two air flow ducts 12, 16. A fresh-air intake chamber is assigned to the first air flow duct 12 and has the fresh-air inlet opening 20, while a recirculated-air intake chamber is assigned to the second air flow duct and has the recirculated-air inlet opening 26. A dividing wall is provided between the two intake chambers, the transfer opening 30 being arranged in said dividing wall.

FIGS. 2 to 7 show various operating modes of the vehicle air conditioning unit, which are controlled by different positions of the flaps of the flap system 32 and the bypass flap 42.

Figure 8:
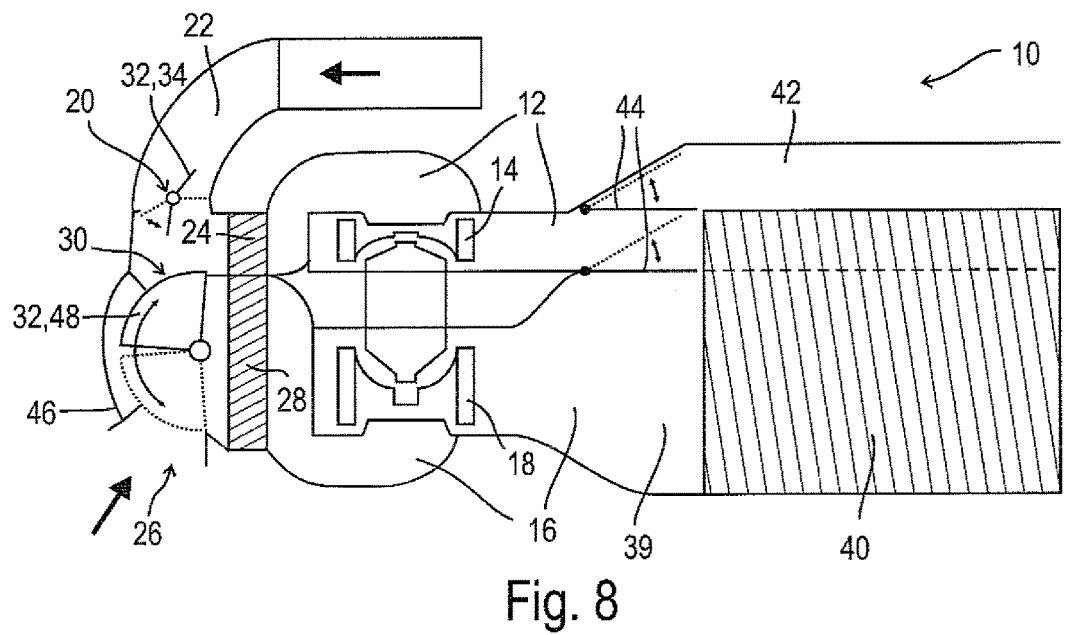
FIG. 8 shows a blower assembly according to a second embodiment of the invention.

FIG. 8 shows a second embodiment of the blower assembly 10, which is formed substantially analogously to the first embodiment shown in FIG. 1. The only difference is in the formation of the flap system 32, in which there is provided a common flap 48, which is assigned to the recirculated-air inlet opening 26 and the transfer opening 30. There are provided in particular three positions of the common flap 48, wherein in a first position, the recirculated-air inlet opening 26 is completely open and the transfer opening is completely closed, a second position, in which the recirculated-air inlet opening 26 is completely closed and the transfer opening 30 is completely open, and a third position, in which both the recirculated-air inlet opening 26 and the transfer opening 30 are completely open. In the embodiment shown, the common flap 48 is in the form of a cylinder or barrel valve.

Alternatively, it would also be possible to provide a common flap which is assigned to the fresh-air inlet opening 20 and the transfer opening 30 or to a further flap combination.

Figure 9:
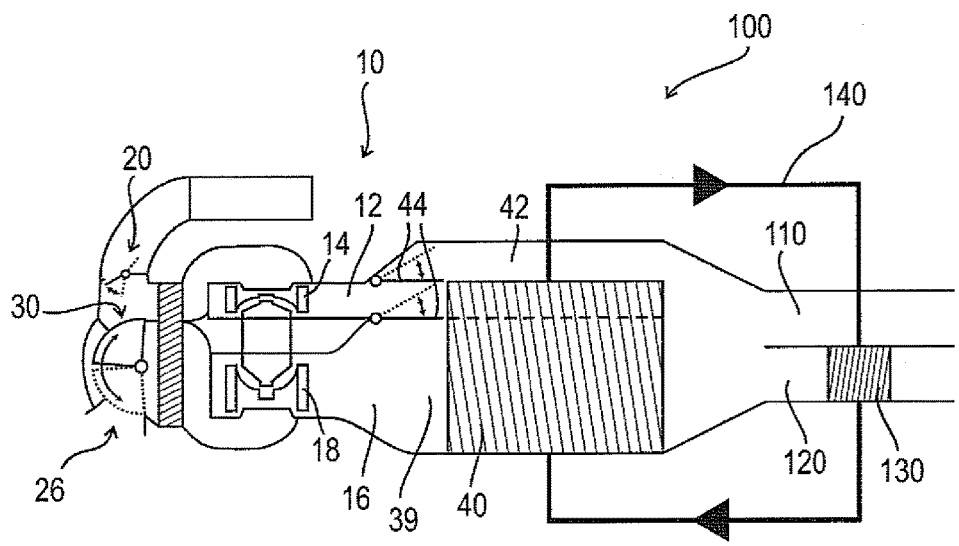
FIG. 9 shows a vehicle air conditioning unit according to the invention.

FIG. 9 shows a vehicle air conditioning unit 100 having a blower assembly 10 according to FIG. 8. Downstream of the blower assembly 10, the common air flow of the blower assembly 10 is divided into a cold air duct 110 and a hot air duct 120. In the hot air duct 120 there is provided an air heating unit 130, which makes it possible to heat the air flow in the hot air duct 120.

In the exemplary embodiment shown, the air heating unit 130 is a condenser, which is integrated into a coolant circuit 140 together with the air cooling unit 40, in the form of an evaporator, of the blower assembly 10. The coolant circuit 140 can be operated as a heat pump, wherein the coolant picks up heat in the air cooling unit 40 and emits heat to the air flowing through in the air heating unit 130.

A method for operating the vehicle air conditioning unit 100 having a blower assembly 10 according to FIG. 1 is described in the following text with reference to FIGS. 2 to 7, each of which shows a different operating mode.

In a first method step, at least one air quality parameter of supplied fresh air and/or recirculated air is determined. For example, the temperature of the fresh air, i.e. the outside temperature, is determined. However, other parameters or a plurality of parameters, for example the outside temperature and the outside humidity, can also be determined.

Subsequently, an operating mode of the vehicle air conditioning unit 100 is selected depending on the at least one air quality parameter. The selection takes place preferably depending on the outside temperature. The temperature ranges of different operating modes can also overlap. At outside temperatures in such an overlapping range, the selection takes place according to a further parameter, in particular the humidity.

Depending on the selected operating mode, optionally fresh air or recirculated air is drawn in in the first and/or second air flow duct.

The air flowing through the second air flow duct 16 is cooled and dried in the air cooling unit 40 with the second air flow duct 16 open.

Depending on the selected operating mode, with the first air flow duct 12 open, optionally the air flowing through the first air flow duct 12 is cooled and dried in the air cooling unit 40 or is guided past the air cooling unit 40.

Subsequently, the air flowing through the first and second air flow ducts is mixed to form a common air flow.

In a first operating mode, which is shown in FIG. 2, the fresh-air inlet opening 20 and the recirculated-air inlet opening 26 are open, while the transfer opening is completely closed. In this way, fresh air is drawn in in the first air flow duct 12, while recirculated air is drawn in in the second air flow duct 16. Since the transfer opening 30 is closed, it is not possible for fresh air and recirculated air to mix upstream of the blowers 14, 18. The bypass flap 44 is set in the first operating mode such that the air flow in the first air flow duct 12 is directed to the bypass duct 42 and thus past the air cooling unit 40.

The first operating mode is advantageous in particular at cold outside temperatures, for example less than/equal to 5° C. At these outside temperatures, cold and dry fresh air which requires no additional drying is drawn in in the first air flow duct 12. The recirculated air from the vehicle interior is by contrast hot and has a relatively high level of humidity and has to be dried, since otherwise condensation on the vehicle windows and a corresponding visibility impairment can occur.

The recirculated air in the second air flow duct 16 runs through the air cooling unit 40 for drying, wherein the recirculated air emits its heat to the coolant in the air cooling unit 40 and the humidity in the air cooling unit 40 condenses and can subsequently flow away.

Downstream of the air cooling unit 40, the air flows of the first and second air flow ducts 12, 16 are mixed to form a common air flow. In the process, the cold, dry fresh air is mixed with the cooled, dried recirculated air.

Subsequently, the common air flow is directed through the hot air duct of the vehicle air conditioning unit 100 and the air heating unit 130 and is heated to the desired temperature.

With the coolant circuit 140 being operated as a heat pump, the heat previously removed from the hot recirculated air can be emitted to the common air flow and thus energy can be saved. On account of the separation of the cold fresh air and hot recirculated air in the first and second air flow ducts 12, 16, the heat pump can be operated optimally. However, if the recirculated air were to be mixed with the fresh air before running through the air cooling unit 40, an average temperature and humidity would be set, and as a result the effect of the heat pump would be reduced.

FIG. 3 shows a second operating mode, in which the recirculated-air inlet opening 26 and the transfer opening 30 are open, while the fresh-air inlet opening 20 is closed. In this way, recirculated air is drawn in both in the first and in the second air flow duct 12, 16. This operating mode is advantageous in particular for average outside temperatures, for example between 5° C. and 20° C.

It is only possible to operate the air cooling unit 40 at temperatures below a maximum temperature, since at higher temperatures unpleasant smells and microbial growth can occur in the condensate of the air cooling unit 40. The recirculated air flow in the first air flow duct 12 is directed past the air cooling unit 40 via the bypass duct 42.

Therefore, it is possible in the corresponding temperature range that, on account of the maximum temperature of the air cooling unit 40, the recirculated air in the second air flow duct 16 has to be cooled and dried further than is optimally required in terms of energy.

With the cooled recirculated air in the air flow of the second air flow duct 16 being mixed with the hot recirculated air in the air flow of the first air flow duct 12 downstream of the air cooling unit 40 to form a common air flow, an average temperature and humidity of the common air flow is set. In this way, the required energy for reheating the air flow in the hot air duct 120 of the vehicle air conditioning unit 100 can be reduced and preferably saved on completely.

FIG. 4 shows a variant of the operating mode in FIG. 3, wherein the fresh-air inlet opening 20 is at least partially open, with the result that a mixture of fresh air and recirculated air is drawn in in the first air flow duct 12. In this way, the air quality, in particular the oxygen content, in the vehicle interior can be improved, in particular in the event of relatively long operation in recirculated air mode. The degree of opening of the fresh-air inlet opening 20 and of the transfer opening 30 can in this case be adapted as desired to the required temperature and air quality demands.

FIG. 5 shows a fourth operating mode, in which fresh air is drawn in in both air flow ducts 12, 16 and is cooled and dried by the air cooling unit 40. In this case, the fresh-air inlet opening 20 and the transfer opening 30 are completely open, while the recirculated-air inlet opening 26 is closed. The bypass flap 44 is in the position which directs the air flow in the first air flow duct 12 to the air cooling unit 40.

This operating mode is advantageous in particular at warm outside temperatures, for example between 15° C. and 25° C. On account of fresh air being drawn in, good air quality in the interior of the vehicle is ensured. With fresh air being drawn in via both air flow ducts 12, 16, the blowers 14, 18 can be operated at optimum power.

Figure 6:
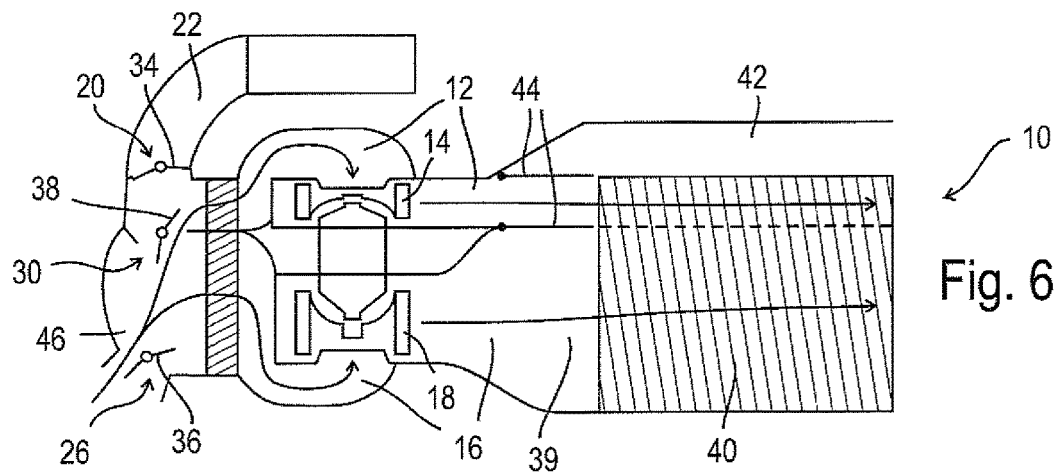
FIG. 6 shows the blower assembly according to FIG. 1 in a fifth operating mode.

A fifth operating mode is illustrated in FIG. 6, in which recirculated air is drawn in in the first air flow duct 12 and in the second air flow duct 16 and the air flows in both air flow ducts 12, 16 are cooled and dried by the air cooling unit 40. This operating mode is advantageous in particular at hot outside temperatures, for example over 25° C., since at these outside temperatures the fresh air has to be cooled excessively greatly. The fresh-air inlet opening 20 is closed, while the recirculated-air inlet opening 26 and the transfer opening 30 are completely open. The bypass flap 44 is set, analogously to the previous operating mode, such that the air flow in the first air flow duct 12 is directed to the air cooling unit 40. In this way, the cooler recirculated air is drawn in at full power of the two blowers 14, 18 and is cooled in the air cooling unit 40.

Figure 7:
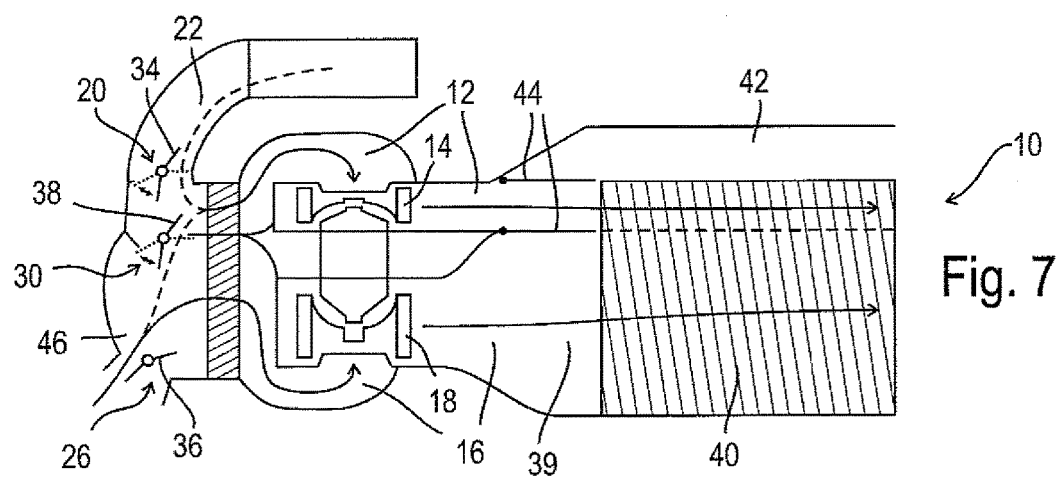
FIG. 7 shows the blower assembly according to FIG. 1 in a sixth operating mode.

FIG. 7 shows a variant of the fifth operating mode, wherein the fresh-air inlet opening 20 is at least partially open, and as a result a mixture of fresh air and recirculated air is drawn in in the first air flow duct 12, in order to ensure sufficient air quality in the vehicle interior in particular in the case of a relatively long operating time. Analogously to the operating mode described in FIG. 4, the degree of opening of the fresh-air inlet opening 20 and of the transfer opening 30 can be adapted to the corresponding temperature and air quality demands.

The invention claimed is:

1. A blower assembly (10) for a vehicle air conditioning unit, the blower assembly (10) comprising:
    a first air flow duct (12), in which a first blower (14) is arranged,
    a second air flow duct (16), in which a second blower (18) is arranged,
    wherein the first air flow duct (12) comprises a fresh-air inlet opening (20) upstream of the first blower (14) and the second air flow duct (16) comprises a recirculated-air inlet opening (26) upstream of the second blower (18),
    a distribution chamber (39) located downstream of the first and second air flow ducts (12, 16),
    an air cooling unit (40) and a bypass duct (42) bypassing the air cooling unit (40) located downstream of the distribution chamber (39), and
    a bypass flap (44) arranged in the distribution chamber (39), with the bypass flap (44) directing at least a part of the air flow in the first air flow duct (12) to the air cooling unit (40) and/or to the bypass duct (42),
    wherein the bypass flap (44) directs substantially all of the air flow in the first air flow duct (12) into the bypass duct (42) in one position of the bypass flap (44), further comprising a closable transfer opening (30) which forms a connection between the first and second air flow ducts (12, 16) when the closable transfer opening (30) is open, further comprising a flap system (32) which controls a flow of fresh air through the fresh-air inlet opening (20) into the first air flow duct (12), a flow of recirculated air through the recirculated-air inlet opening (26) into the second air flow duct (16) and a flow of transfer air between the two air flow ducts (12, 16) through the transfer opening (30), wherein the flap system (32) has a fresh-air flap (34) at the fresh-air inlet opening (20), a recirculated-air flap (36) at the recirculated-air inlet opening (26) and/or a transfer flap (38) at the transfer opening (30), and wherein the flap system (32) has a common flap (48) for at least two openings which is different than the fresh-air flap (34) and the recirculated-air flap (36).

2. The blower assembly (10) as claimed in claim 1, characterized in that a filter (24) is provided between the fresh-air inlet opening (20) and the first blower (14) in the first air flow duct (12) a filter (28) is provided between the recirculated-air inlet opening (26) and the second blower (18) in the second air flow duct (16).

3. The blower assembly (10) as claimed in claim 2, wherein the two filters (24, 28) are formed by a common filter element or by individual filter elements.

4. The blower assembly (10) as claimed in claim 1, wherein the first and second blowers (14, 18) are in the form of a twin blower.

5. A vehicle air conditioning unit (100) having a blower assembly (10) as claimed in claim 1.

6. A blower assembly (10) for a vehicle air conditioning unit, the blower assembly (10) comprising:
 a first air flow duct (12), in which a first blower (14) is arranged,
 a second air flow duct (16), in which a second blower (18) is arranged,
 wherein the first air flow duct (12) comprises a fresh-air inlet opening (20) upstream of the first blower (14) and the second air flow duct (16) comprises a recirculated-air inlet opening (26) upstream of the second blower (18),
 a closable transfer opening (30) which forms a connection between the first and second air flow ducts (12, 16) when the closable transfer opening (30) is open, and a flap system (32) which controls a flow of fresh air through the fresh-air inlet opening (20) into the first air flow duct (12), a flow of recirculated air through the recirculated-air inlet opening (26) into the second air flow duct (16) and a flow of transfer air between the two air flow ducts (12, 16) through the transfer opening (30), wherein the flap system (32) has a common flap (48) for at least two openings which is different than a fresh-air flap (34) and a re-circulated air flap (36).

7. A method for operating a vehicle air conditioning unit (100) having a blower assembly (10), wherein the blower assembly (10) comprises:
 a first air flow duct (12), in which a first blower (14) is arranged,
 a second air flow duct (16), in which a second blower (18) is arranged,
 wherein the first air flow duct (12) comprises a fresh-air inlet opening (20) upstream of the first blower (14) and the second air flow duct (16) comprises a recirculated-air inlet opening (26) upstream of the second blower (18),
 a distribution chamber (39) located downstream of the first and second air flow ducts (12, 16),
 an air cooling unit (40) and a bypass duct (42) bypassing the air cooling unit (40) located downstream of the distribution chamber (39), and
 a bypass flap (44) arranged in the distribution chamber (39), with the bypass flap (44) directing at least a part of the air flow in the first air flow duct (12) to the air cooling unit (40) and/or to the bypass duct (42),
 wherein the bypass flap (44) directs substantially all of the air flow in the first air flow duct (12) into the bypass duct (42) in one position of the bypass flap (44), and further comprises a closable transfer opening (30) which forms a connection between the first and second air flow ducts (12, 16) when the closable transfer opening (30) is open, and further comprises a flap system (32) which controls a flow of fresh air through the fresh-air inlet opening (20) into the first air flow duct (12), a flow of recirculated air through the recirculated-air inlet opening (26) into the second air flow duct (16) and a flow of transfer air between the two air flow ducts (12, 16) through the transfer opening (30), wherein the flap system (32) has a fresh-air flap (34) at the fresh-air inlet opening (20), a recirculated-air flap (36) at the recirculated-air inlet opening (26) and/or a transfer flap (38) at the transfer opening (30), and wherein the flap system (32) has a common flap (48) for at least two openings which is different than the fresh-air flap (34) and the recirculated-air flap (36), the method comprising the method steps of:
 determining at least one air quality parameter of supplied fresh air and/or recirculated air;
 selecting an operating mode of the vehicle air conditioning unit (100) depending on the at least one air quality parameter;
 optionally drawing in fresh air or recirculated air in the first and/or second air flow duct (12, 16) depending on the selected operating mode;
 cooling and drying the air flowing through the second air flow duct (16) in the air cooling unit (40) with the second air flow duct (16) open;
 optionally cooling and drying the air flowing through the first air flow duct (12) in the air cooling unit (40) or directing the air flowing through the first air flow duct past the air cooling unit (40) depending on the selected operating mode with the first air flow duct (12) open; and
 mixing the air flowing through the first and second air flow ducts (12, 16) to form a common air flow.

8. The method as claimed in claim 7, wherein, at cold outside temperatures, the method further comprises the following steps:
 drawing in exclusively fresh air via the first air flow duct (12) and recirculated air via the second air flow duct (16) and
 directing the air flowing through the first air flow duct (12) past the air cooling unit (40).

9. The method as claimed in claim 7, wherein in one operating mode, the method further comprises the following steps:
 drawing in fresh air and/or recirculated air via the first air flow duct (12) and recirculated air via the second air flow duct (16), and
 directing the air flowing through the first air flow duct (12) past the air cooling unit (40),
 wherein mixing ratios of fresh air and recirculated air are selected such that the required energy for reheating the common air flow is minimized.

10. The method as claimed in claim 7, wherein in one operating mode, the method further comprises the following steps:
- drawing in fresh air and/or recirculated air via the first air flow duct (12) and recirculated air via the second air flow duct (16), and
- directing at least a part of the air flowing through the first air flow duct (12) past the air cooling unit (40),
- wherein mixing ratios of fresh air and recirculated air or of that portion of the air flowing through the first air flow duct that is directed past the air cooling unit (40) are selected such that the required energy for reheating the common air flow is minimized.

11. The method as claimed in claim 7, further comprising the step of operating the air cooling unit (40) as part of a heat pump, wherein the heat obtained in the air cooling unit (40) is used to reheat the common air flow.

12. The method as claimed in claim 7, wherein in one operating mode, the method further comprises following steps:
- drawing in fresh air via both air flow ducts (12, 16), and
- cooling and drying the fresh air by way of the air cooling unit (40).

13. The method as claimed in claim 7, wherein in one operating mode, the method further comprises following steps:
- drawing in fresh air and/or recirculated air via the first air flow duct (12),
- recirculated air via the second air flow duct (16), and
- cooling and drying the air flows in both air flow ducts (12, 16) by means of the air cooling unit (40).

\* \* \* \* \*

UNITED STATES PATENT AND TRADEMARK OFFICE
CERTIFICATE OF CORRECTION

Page 1 of 1

PATENT NO. : 10,059,171 B2
APPLICATION NO. : 14/381104
DATED : August 28, 2018
INVENTOR(S) : Bodo Gesell It is certified that error appears in the above-identified patent and that said Letters Patent is hereby corrected as shown below:

In the Claims

Claim 2, Column 9, Line 20, please delete "duct (12) a filter" and replace with -- duct (12) or a filter --

Signed and Sealed this
Eleventh Day of December, 2018

Andrei Iancu
*Director of the United States Patent and Trademark Office*